(12) United States Patent
Snyder et al.

(10) Patent No.: US 9,140,558 B2
(45) Date of Patent: Sep. 22, 2015

(54) NAVIGATION SYSTEM INITIALIZATION WITH INERTIAL DATA COMPENSATION

(75) Inventors: Scott Snyder, Mahtomedi, MN (US); Benjamin Mohr, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 468 days.

(21) Appl. No.: 13/188,847

(22) Filed: Jul. 22, 2011

(65) Prior Publication Data

US 2013/0024115 A1    Jan. 24, 2013

(51) Int. Cl.
  *G01C 21/16*    (2006.01)
  *G01C 25/00*    (2006.01)
  *G01S 19/49*    (2010.01)

(52) U.S. Cl.
  CPC ............ *G01C 21/165* (2013.01); *G01C 25/005* (2013.01); *G01S 19/49* (2013.01)

(58) Field of Classification Search
  CPC ........ G01C 21/00; G01C 21/14; G01C 21/16; G01C 22/00; G01C 22/02; G01P 1/127; G01P 3/00; G01P 3/02; G01P 3/64; G01P 3/36
  USPC ........................................................ 701/221
  See application file for complete search history.

(56) References Cited

U.S. PATENT DOCUMENTS

| | | | |
|---|---|---|---|
| 5,422,817 A | 6/1995 | Tazartes et al. | |
| 5,828,980 A | 10/1998 | Tazartes et al. | |
| 5,852,790 A * | 12/1998 | Hayes et al. | 701/484 |
| 7,512,493 B2 | 3/2009 | Morgan | |
| 7,606,665 B2 | 10/2009 | Weed | |
| 7,739,045 B2 | 6/2010 | Thompson, Jr. | |
| 2009/0326740 A1 | 12/2009 | Wang | |
| 2010/0007550 A1 | 1/2010 | Nagamiya et al. | |
| 2011/0169689 A1 | 7/2011 | Wang et al. | |

FOREIGN PATENT DOCUMENTS

WO    WO 2005071431    8/2005

OTHER PUBLICATIONS

Snyder et al., "Declaration of Scott Snyder and Benjamin Mohr under 37 CFR 1.132", Jun. 12, 2014, pp. 15.
European Patent Office, "European Search Report", "from Foreign Counterpart of U.S. Appl. No. 13/188,847", Oct. 8, 2013, pp. 1-3, Published in: EP.

* cited by examiner

*Primary Examiner* — John Q Nguyen
*Assistant Examiner* — Kyung Kim
(74) *Attorney, Agent, or Firm* — Fogg & Powers LLC

(57) ABSTRACT

An example embodiment includes a method for initializing a navigation system. The method includes receiving inertial measurement data from an inertial measurement unit over time and storing the inertial measurement data in a buffer with an indication of a time of validity for the inertial measurement data. The method also includes receiving navigation data from an aiding source, the navigation data having a time of validity, and initializing a navigation solution with the navigation data. The method also includes summing inertial measurement data from the buffer to produce an inertial motion estimate for a time increment after the time of validity of the navigation data, applying at least one of coning or sculling compensation to the inertial motion estimate to produce a compensated inertial motion estimate, and propagating the navigation solution forward based on the compensated inertial motion estimate.

20 Claims, 2 Drawing Sheets

NAVIGATION SYSTEM INITIALIZATION WITH INERTIAL DATA COMPENSATION

STATEMENT REGARDING FEDERALLY SPONSORED RESEARCH OR DEVELOPMENT

This invention was made with Government support under Contract No. FA8681-06-C-0152 awarded by Raytheon. The Government may have certain rights in the invention.

BACKGROUND

Real-time inertial navigation systems should be initialized to provide an initial position, velocity, and attitude at start up prior to integration of inertial sensor data. An integrated navigation system can use non-inertial sources (also referred to herein as aiding sources) to provide this initial position, velocity, and attitude information. Example aiding sources can include a master navigation system, GPS receiver, barometric altimeter, magnetometers, and others.

Aiding source data is typically delayed in time (e.g., latent) by the time the navigation system can use the information. The aiding source data can be latent due to limitations in hardware and software such as digital update rates, available computational resources, interface message transmission and reception limitations, and other reasons. The latency of this data can introduce errors into a navigation solution if the latency is not accounted for when the data is used for initialization of the navigation system.

The errors introduced will depend on the dynamics of the body in which the inertial navigation system is associated. For example, for a vehicle traveling at 100 meters/second a 1 second delay in the aiding source data will introduce a 100 meter position error for the initialization of the inertial navigation system. Vehicle acceleration dynamics can introduce velocity error and vehicle angular rate dynamics can introduce attitude error. The greater the vehicle dynamics, the larger the errors for a given time delay.

SUMMARY

An example embodiment includes a method for initializing a navigation system. The method includes receiving inertial measurement data from an inertial measurement unit over time and storing the inertial measurement data in a buffer with an indication of a time of validity for the inertial measurement data. The method also includes receiving navigation data from an aiding source, the navigation data having a time of validity, and initializing a navigation solution with the navigation data. The method also includes summing inertial measurement data from the buffer to produce an inertial motion estimate for a time increment after the time of validity of the navigation data, applying at least one of coning or sculling compensation to the inertial motion estimate to produce a compensated inertial motion estimate, and propagating the navigation solution forward based on the compensated inertial motion estimate.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
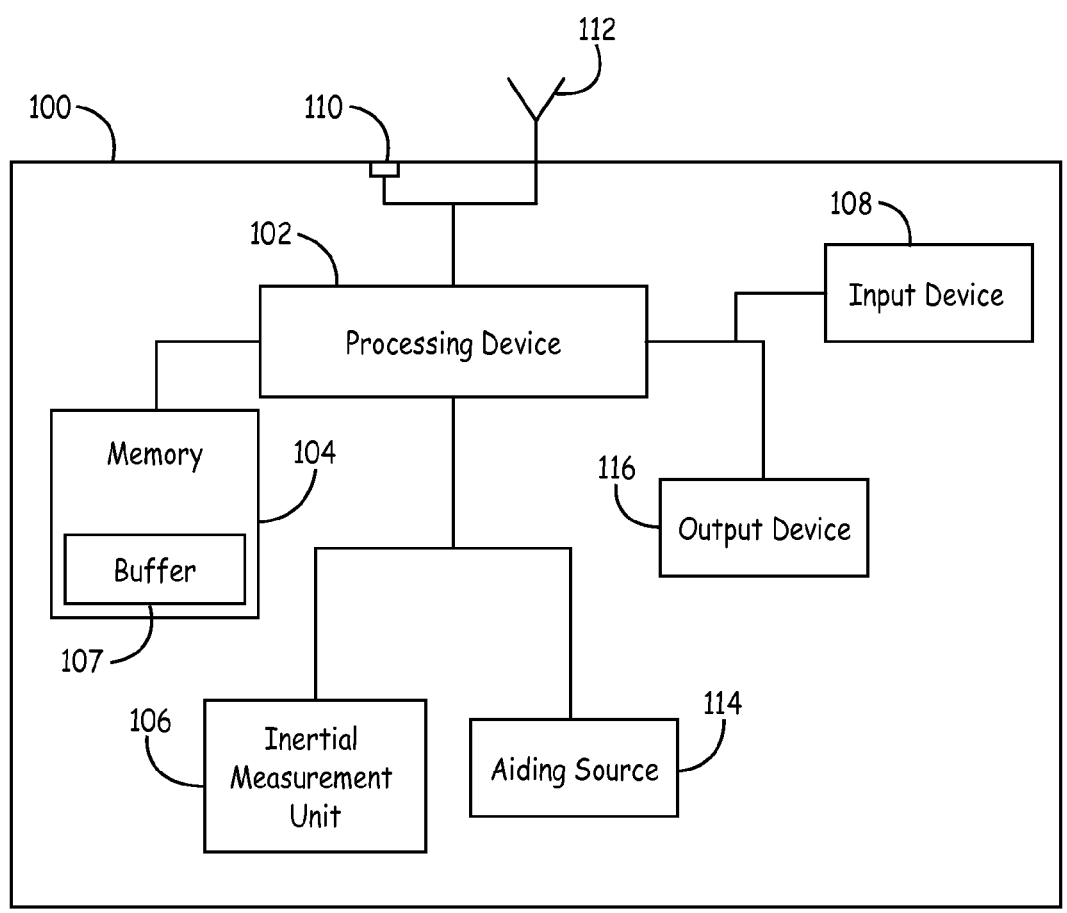
FIG. 1 is a block diagram of an example navigation system according to various embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below relate to initialization of a navigation system. In some examples, the navigation system is an inertial navigation system that can be initialized with data from an aiding source. The aiding source data can be latent by the time it is processed by the navigation system. In some example, buffered inertial data can be used to propagate the navigation solution forward from the time of the aiding source data to the current time.

FIG. 1 is a block diagram of an example navigation system 100. The navigation system 100 can include one or more processing devices 102 coupled to one or more memory devices 104. The navigation system 100 can also include one or more inertial measurement units (IMUs) 106 that are coupled to the one or more processing devices 102. The navigation system 100 can include a buffer 107 coupled to the one or more processing devices 102. In this example, the buffer 107 is shown as part of the one or more memory devices 104; however, in other examples the buffer 107 can be an entity separate from the one or more memory devices 104.

In some examples, the navigation system 100 can be configured to receive navigation data for initialization from an aiding source (also referred to herein as "aiding source data"). In these examples, the navigation system 100 can have an appropriate means for receiving the aiding source data. For example, if the aiding source data is input by a user the navigation system 100 can include one or more input devices 108 (e.g., a keyboard, touch screen, microphone, mouse, etc.) for receiving the user input. In examples where the aiding source data is received from another system, the navigation system 100 can be coupled to the other system through a wire or wired connection and can include a port 110 and/or an antenna 112 to facilitate coupling to the other system. In some examples, the navigation system 100 can include one or more of its own aiding sources 114 that are coupled to the one or more processing devices 102. The one or more aiding sources 114 can include a satellite navigation system receiver (e.g., for the global positioning system (GPS), the GLONASS system, the Beidou navigation system, and/or the Galileo positioning system), a barometric altimeter, a magnetometers, a computer vision system, a range finder, and other sources). The navigation system 100 can also include an output device 116 (e.g., an antenna, port, display device, speaker, etc.) for sending a navigation solution to another system and/or providing a navigation system to a user. In some examples, the output device 116 can be the same device as used to receive a signal from another system (e.g., antenna 112).

In an example, the navigation system 100 and the one or more processing devices 102 can be "configured" to perform certain acts when the one or more memory devices 104 include instructions which, when executed by the one or more processing devices 102, cause the one or more processing devices 102 to perform those acts. These instructions may be described herein as one or more modules. Accordingly, the one or more memory devices 104 can include instructions which, when executed by the one or more processing devices 102 cause the one or more processing devices 102 to implement the functions of a navigation system 100 as described herein. These instructions can be stored on any appropriate processor-readable medium used for storage of processor-readable instructions or data structures. This processor-readable media can include the one or more memory devices 110 and/or other suitable media. Suitable processor-readable media can include tangible media such as magnetic or optical media. For example, tangible media can include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media can also include transmission media such as electrical, electromagnetic, or digital signals, conveyed via a communication medium such as a network and/or a wireless link.

The one or more processing devices 102 can include a central processing unit (CPU), microcontroller, microprocessor, field programmable gate array (FPGA), application specific integrated circuit (ASIC) and other processing devices. The following description may refer to the one or more processing devices 102, the one or more memory devices 104, and the one or more IMUs 106, the one or more input devices 108, the one or more aiding sources 114, and the one or more output devices 116 in the singular form (e.g., the processing device 102); however, it should be understood that the singular form is used for simplicity only, and that use of the singular form is not intended to limit these components to a single component (e.g., a single processing device 102). Accordingly, although the singular form is used, it should be understood that one or more of the particular components can be used as indicated above.

Figure 2:
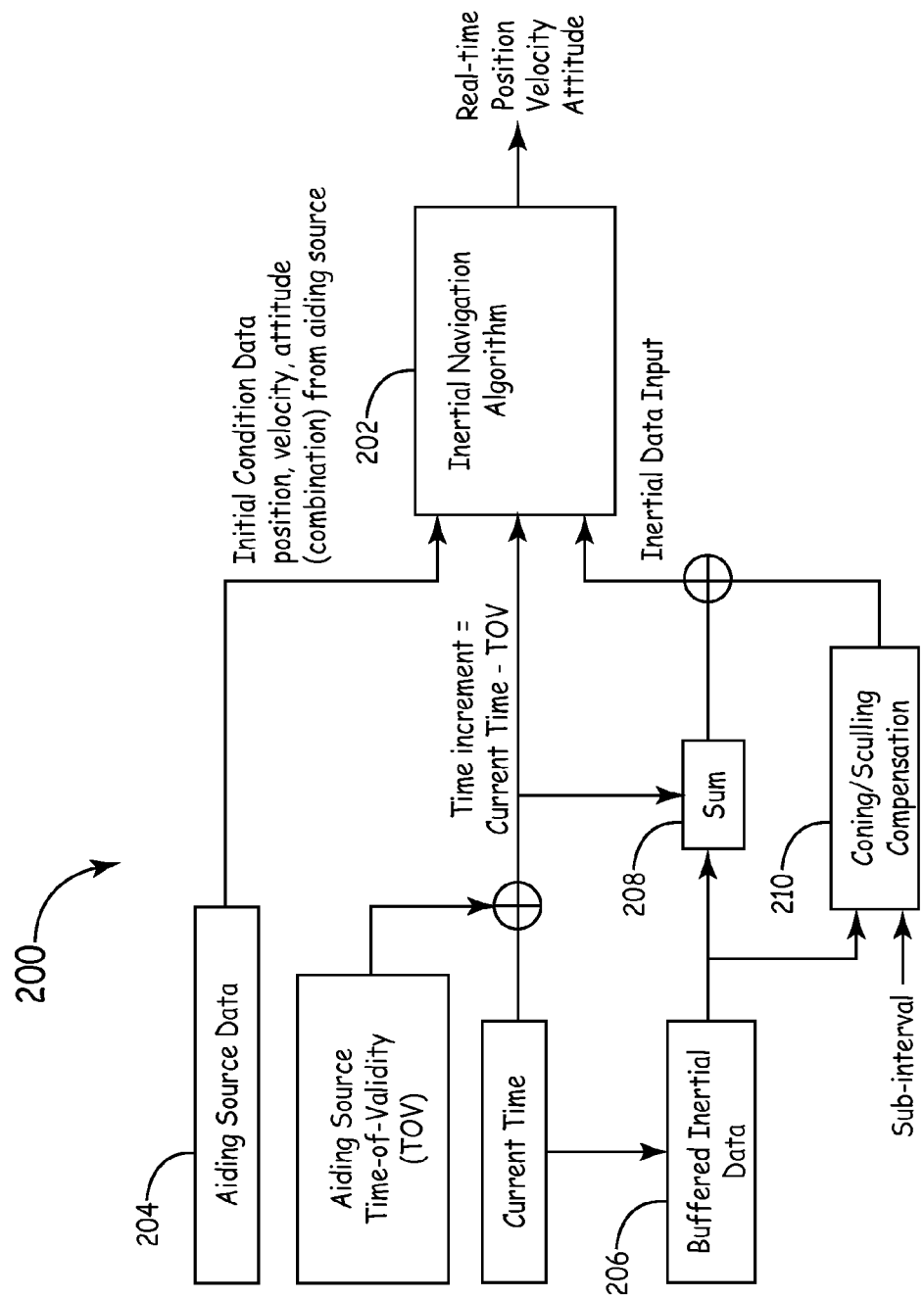
FIG. 2 is a flow diagram of an example method for initialization of the navigation system of FIG. 1.

FIG. 2 is a flow diagram of an example method 200 for initialization of the navigation system 100. As shown, the navigation system 100 can provide a navigation solution for a body with which the navigation system 100 is associated. In some examples, this navigation solution can be a real-time navigation solution. For example, the navigation system 100 can be configured to be associated with (e.g., disposed within) a munition (e.g., missile, artillery, projectile, etc.), an aircraft (e.g., an unmanned aircraft, plane, jet, helicopter, etc.), a land and/or water based vehicle, a portable device, or other entity. In some examples, the navigation system 100 can be a standalone unit. When the navigation solution 100 is associated with a body, the navigation system 100 can provide a navigation solution corresponding to the body to another system (e.g., a control system) associated with the body. This other system can perform actions based on the navigation control system. For example, a vehicle control system can control the operation (e.g., guidance, navigation) of vehicle based on the navigation solution. In another example, an aircraft control system can use the navigation solution to provide flight control for the aircraft.

In an example, the instructions on the memory 104 can include a navigation solution module 202 to calculate the navigation solution based on one or more inputs. This navigation solution module 202 can operate as an integrated navigation system that receives inputs from both the IMU 106 and the aiding source 114. Initialization of the navigation system 100 can provide the navigation module 202 with navigation data 204 corresponding to a body in which the navigation system 100 is associated. In an example, the navigation system 100 can initialize immediately after start up of the navigation system 100. For example, after a period (e.g., greater than 20 seconds) of no power being provided to the navigation system 100, power can be applied (e.g., re-applied). Applying power to the navigation system 100 can cause the navigation system 100 to initialize (e.g., re-initialize).

During initialization the navigation module 202 can use the navigation data 204 to determine an initial navigation solution from which the navigation module 202 can update based on inputs to provide updated navigation solutions for the body. The navigation data 204 can be received by the navigation solution module 202 from an aiding source. As mentioned above, this aiding source can be included within the navigation system 100 (e.g., aiding source 114) or can be part of another system. In an example, the navigation data 204 can include a position, velocity, and attitude corresponding to the body with which the navigation system 100 is associated. The navigation data can, for example, be received from a master navigation system from which the body with which the navigation system 100 has been released from. For example, if the body is a munition that is being carried with an aircraft or vehicle, the munition can be powered-up and initialized before the munition is released from the aircraft or vehicle. Shortly after power-up, a navigation system on the aircraft or vehicle (e.g., the master navigation system) can provide the munition with navigation data (e.g., position, velocity, and attitude) for the aircraft or vehicle at the time of release of the munition. The navigation system 100 can use this navigation data to determine an initial navigation solution for the munition from which the navigation system 100 can build on to continue to provide navigation solution updates as the munition travels through the air or water.

Regardless of the origination of this navigation data from an aiding source (also referred to herein as aiding source data 204), the aiding source data 204 has a time of validity (e.g., the time at which the data was captured and/or accurate). For example, if a master navigation system determines a navigation solution for a body at a particular time, the particular time is the time of validity for that navigation solution. Thus, the navigation solution is valid at the time of validity, but may or may not be valid at times before and after the time of validity due to, for example, movement of the body. In many cases, by the time the aiding source data 204 is received and ready for use by the navigation solution module for initialization, the aiding source data 204 is latent. That is, the time of validity for the aiding source data 204 is earlier than the current time to an extent that use of the aiding source data 204 to directly determine a real-time navigation solution can cause significant errors. This latency can be due to hardware or software limitations of the navigation system 100 or other system, communication delays, delays in start-up of the aiding source 114, or other things. In an example, the time of validity for the aiding source data can be in the range of 0.1 seconds to 2.0 seconds earlier than the current time.

To account for the latency of the aiding source data 204, the navigation system 100 use buffered inertial data 206 to update the navigation solution. For example, shortly after power-up of the navigation system 100, the IMU 106 may begin providing inertial data. Notably, the IMU 106 may begin providing inertial data prior to reception of the aiding source data 204 used for initialization. This inertial data can be stored in the buffer 107 along with an indication of a time of validity for the inertial data. In an example, the IMU 106 can produce data at a rate of about 200 Hz and data can be stored in the buffer 107 at a rate of about 100 Hz. In an example, the buffer 207 is configured to hold in the range of 50 to 500 samples of inertial data.

When the navigation solution module 202 receives the aiding source data 204, the navigation solution module 202 also receives the time of validity for the aiding source data 204. The navigation solution module 202 then initializes a navigation solution corresponding to the time of validity based on the aiding source data 204. In some examples, initializing a navigation solution can include setting the navigation solution to equal the aiding source data 204.

Once the navigation solution module 202 has initialized with the aiding source data 204, the navigation solution module 202 can bring the navigation solution up to date by propagating the navigation solution forward in time based on the movement indicated by the buffered inertial data 206. In an example, however, if the time of validity for the aiding source data 204 is earlier than the oldest inertial data sample in the buffer, the navigation system 100 provides a warning indicating as such and uses the aiding source data 204 to initialize the navigation solution module 202 without compensating for the latency with the inertial data.

The navigation solution can be propagated forward in one larger step or in a plurality of smaller steps. Use of a single larger step can be quicker and less computationally intensive, but can be less accurate then use of a plurality of smaller steps. Typically, the more granular the steps, the more accurate the navigation solution. Each additional step, however, adds another round of processing by the navigation solution module 202. For the most accurate navigation solution, the navigation solution module 202 would process each inertial sample individually through the inertial navigation module 202; however, this is impractical in many circumstances.

To propagate the navigation solution forward from a first time (e.g., the time of validity of the aiding source data 204) to a second time (e.g., the current time of the navigation system 100), buffered inertial data 206 corresponding to the time increment from the first time to the second time is summed (sum block 208). The output of the sum block 208 is an inertial data estimate corresponding to the inertial change in the body from the first time to the second time. For example, the inertial motion estimate in the body can include the difference in pitch, yaw, roll, and acceleration from the first time to the second time. Since body may be rolling or spinning, the difference may be larger than 360 degrees.

Summing the inertial data 206, however, may introduce errors into the navigation solution due to, for example, the acceleration dynamics and angular rate dynamics for the body during this time. These errors can include coning (attitude integration) and sculling (velocity integration) errors. In an example, compensation can be applied to the inertial motion estimate before the inertial motion estimate is provided to the navigation solution module 202. In an example, this compensation can include compensation for coning or sculling or both. To compensate for coning or sculling or both, the buffered inertial data 204 for the time increment from the first time to the second time can be processed in sub-intervals to produce a compensation estimate for the time increment. For example, the time increment can be divided into a plurality of sub-intervals, and compensation corresponding to each sub-interval can be determined (coning/sculling compensation 210) based on the inertial data for the respective sub-interval. Coning/sculling compensation can operate on the sub-interval data with processor efficient algorithms which are not as computationally intensive as the navigation algorithm. The compensation estimate can be a correction produced by the coning/sculling algorithms which is applied to the inertial motion estimate (e.g., the major interval sum), allowing the inertial motion estimate to be processed by the navigation algorithms without incurring large navigational errors. Thus, the compensation estimate can be applied to the inertial motion estimate to produce compensated inertial motion estimate.

In an example, there can be in the range of 2 to 50 sub-intervals for a time increment. In an example, the navigation system 100 can provide a selectable sub-interval size. Accordingly, a user can provide a selection (e.g., a number of sub-intervals or a length for a sub-interval) corresponding to, for example, the desired accuracy of the navigation solution and/or performance capabilities of the navigation system 100.

The compensated inertial motion estimate can be provided to the navigation solution module 202 along with the corresponding time increment for the compensated inertial motion estimate. The navigation solution module 202 can then propagate the navigation solution forward in time commensurate with the time increment based on the compensated inertial motion estimate. In an example, a time increment can be in the range of 0.1 seconds to 2.0 seconds. In an example, the navigation system 100 can provide a selectable time increment size. Accordingly, a user can provide a selection (e.g., a number of time increments or a length for a time increment) corresponding to, for example, the desired accuracy of the navigation solution and/or performance capabilities of the navigation system 100.

In an example, the navigation solution can be propagated forward from the time of validity of the aiding source data 204 to the current time by resolving a single time-step. Here, the time increment corresponds to the time period from the time of validity to the current time and the compensated inertial motion estimate is determined as discussed above using this time increment.

In another example, the navigation solution can be propagated forward by resolving multiple time-steps. Accordingly, the period of time from the time of validity of the aiding source data 204 to the current time can be divided into a plurality of time increments. For each time increment a compensated inertial motion estimate can be determined and provided to the navigation solution module 202 for forward propagation of the navigation solution. That is, a first compensated inertial motion estimate can be generated for a first time increment as describe above. The navigation solution can be propagated forward from the time of validity of the aiding source data 204 to time corresponding to the end of the first time increment based on this first compensated inertial motion estimate. A second compensated inertial motion estimate can also be generated for a second time increment. The navigation solution can then be propagated forward from the time corresponding to the end of the first increment to the time corresponding to the end of the second estimate based on the second compensated inertial motion estimate. A compensated inertial motion estimate for each time increment in the period from the time of validity to the current time can be generated and used to propagate the navigation solution in this manner until the navigation solution reaches the current time.

Once the navigation solution has been propagated forward to the current time, the navigation system 100 has been initialized and can send a real-time navigation solution to another system and/or to a user. In an example, the navigation solution provided by navigation system 100 includes position, velocity, and attitude for a body associated with the navigation system 100. Once the navigation system 100 has been initialized, the navigation system 100 can continue to calculate and real-time navigation solutions based on inputs from the IMU 106 and the aiding source 114 if available.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for initializing a navigation system, the method comprising:
   receiving inertial measurement data from one or more inertial sensors during a period after power-up of the navigation system and prior to initialization of the navigation system;
   storing the inertial measurement data in a buffer with an indication of a time of validity for the inertial measurement data;
   receiving navigation data from an aiding source prior to initialization of the navigation system, the navigation data having a time of validity that is earlier than a time in which the navigation data is received, wherein the navigation data is not valid for the time in which the navigation data is received;
   estimating an initial navigation solution with the navigation data;
   summing inertial measurement data from the buffer to produce an inertial motion estimate for a time increment after the time of validity of the navigation data;
   applying at least one of coning or sculling compensation to the inertial motion estimate to produce a compensated inertial motion estimate;
   propagating the initial navigation solution forward in time by the time increment based on the compensated inertial motion estimate to update the navigation solution to the current time; and
   initializing the navigation system with the navigation solution that is updated to the current time.

2. The method of claim 1, wherein the aiding source includes one of a master navigation system, a satellite navigation system receiver, a barometric altimeter, a magnetometer, and input data from a user.

3. The method of claim 1, wherein the time increment corresponds to a period of time from the time of validity to the current time; and
   wherein propagating the navigation solution forward includes resolving a single time-step for the navigation solution from the time of validity of the navigation data to the current time.

4. The method of claim 1, wherein the time increment is one of a plurality of time increments, the method comprising:
   summing inertial measurement data over the plurality of time increments to produce an inertial motion estimate for each time increment, the plurality of time increments corresponding to a period of time from the time of validity to the current time;
   applying at least one of coning or sculling compensation to each inertial motion estimate to produce a compensated inertial motion estimate for each time increment; and
   resolving multiple time-steps for the navigation solution by consecutively applying the compensated inertial motion estimates for each time-increment to the navigation solution.

5. The method of claim 1, wherein applying at least one of coning or sculling compensation includes:
   determining at least one of coning or sculling compensation over a plurality of sub-intervals of the time increment to produce a compensation estimate for each sub-interval;
   combining the compensation estimates for each sub-interval to form a compensation estimate for the time increment; and
   applying the compensation estimate for the time increment to the inertial motion estimate.

6. The method of claim 1, wherein there are in the range of 2 to 50 sub-intervals of the time increment.

7. The method of claim 1, wherein the time increment is in the range of 2.0 seconds to 0.1 seconds.

8. The method of claim 1, wherein the navigation data includes position, velocity and attitude for the navigation system.

9. The method of claim 1, comprising:
   sending real-time position, velocity, and attitude information to another device.

10. A navigation system comprising:
    one or more processing device;
    one or more inertial sensors coupled to the one or more processing devices;
    one or more memory devices coupled to the one or more processing devices and including instructions which, when executed by the one or more processing devices, cause the one or more processing devices to:
       receive inertial measurement data from the one or more inertial sensors during a period after power-up of the navigation system and prior to initialization of the navigation system;
       store the inertial measurement data in a buffer with an indication of a time of validity for the inertial measurement data;
       receive navigation data from an aiding source prior to initialization of the navigation system, the navigation data having a time of validity that is earlier than a time in which the navigation data is received, wherein the navigation data is not valid for the time in which the navigation data is received;
       estimate an initial navigation solution with the navigation data;
       sum inertial measurement data from the buffer to produce an inertial motion estimate for a time increment after the time of validity of the navigation data;
       apply at least one of coning or sculling compensation to the inertial motion estimate to produce a compensated inertial motion estimate;
       propagate the initial navigation solution forward in time by the time increment based on the compensated inertial motion estimate to update the navigation solution to the current time; and
       initialize the navigation system with the navigation solution that is updated to the current time.

11. The navigation system of claim 10, wherein the navigation data includes position, velocity and attitude for the navigation system.

12. The navigation system of claim 11, comprising:
    a global position system as the aiding source.

13. The navigation system of claim 10, wherein the instructions, when executed by the one or more processing devices, cause the one or more processing devices to:
    send real-time position, velocity, and attitude information to another device.

14. The navigation system of claim 10, wherein the time increment corresponds to a period of time from the time of validity to the current time; and wherein propagate the navigation solution forward includes resolve a single time-step for the navigation solution from the time of validity of the navigation data to the current time.

15. The navigation system of claim 10, wherein the time increment is one of a plurality of time increments, wherein the instructions, when executed by the one or more processing devices, cause the one or more processing devices to:

sum inertial measurement data over the plurality of time increments to produce an inertial motion estimate for each time increment, the plurality of time increments corresponding to a period of time from the time of validity to the current time;

apply at least one of coning or sculling compensation to each inertial motion estimate to produce a compensated inertial motion estimate for each time increment; and resolve multiple time-steps for the navigation solution by consecutively applying the compensated inertial motion estimates for each time-increment to the navigation solution.

16. The navigation system of claim 10, wherein apply at least one of coning or sculling compensation includes:

determine at least one of coning or sculling compensation over a plurality of sub-intervals of the time increment to produce a compensation estimate for each sub-interval;

sum the compensation estimates for each sub-interval to form a compensation estimate for the time increment; and apply the compensation estimate for the time increment to the inertial motion estimate.

17. A non-transitory processor-readable medium including instructions which, when executed by at least one processor, cause the at least one processor to:

receive inertial measurement data from one or more inertial sensors during a period after power-up of a navigation system and prior to initialization of the navigation system;

store the inertial measurement data in a buffer with an indication of a time of validity for the inertial measurement data;

receive navigation data from an aiding source prior to initialization of the navigation system, the navigation data having a time of validity that is earlier than a time in which the navigation data is received, wherein the navigation data is not valid for the time in which the navigation data is received;

estimate an initial navigation solution with the navigation data;

sum inertial measurement data from the buffer to produce an inertial motion estimate for a time increment after the time of validity of the navigation data;

apply at least one of coning or sculling compensation to the inertial motion estimate to produce a compensated inertial motion estimate;

propagate the initial navigation solution forward in time by the time increment based on the compensated inertial motion estimate to update the navigation solution to the current time; and initialize the navigation system with the initial navigation solution that is updated to the current time.

18. The processor-readable medium of claim 17, wherein the time increment corresponds to a period of time from the time of validity to the current time; and wherein propagate the navigation solution forward includes resolve a single time-step for the navigation solution from the time of validity of the navigation data to the current time.

19. The processor-readable medium of claim 17, wherein apply at least one of coning or sculling compensation includes:

determine at least one of coning or sculling compensation over a plurality of sub-intervals of the time increment to produce a compensation estimate for each sub-interval;

sum the compensation estimates for each sub-interval to form a compensation estimate for the time increment; and apply the compensation estimate for the time increment to the inertial motion estimate.

20. The processor-readable medium of claim 17, wherein the instructions, when executed by the at least one processor, cause the at least one processor to:

send real-time position, velocity, and attitude information to another device.

\* \* \* \* \*